United States Patent [19]
Burnett et al.

[11] Patent Number: 6,067,030
[45] Date of Patent: May 23, 2000

[54] METHOD AND APPARATUS FOR PROVIDING NETWORK INFRASTRUCTURE INFORMATION FOR A NETWORK CONTROL CENTER

[75] Inventors: Jim Burnett, Parker; Michael R. Delany, Evergreen, both of Colo.; Hossein Eslambolchi, Basking Ridge, N.J.

[73] Assignee: AT&T Corp., New York, N.Y.

[21] Appl. No.: 09/039,115

[22] Filed: Mar. 13, 1998

[51] Int. Cl.$^7$ .................................................. G08B 21/00
[52] U.S. Cl. ............................... 340/870.05; 340/871.07; 340/870.16; 340/870.17; 340/637; 379/32; 379/33; 455/423; 320/48; 320/43
[58] Field of Search ........................ 340/870.11, 870.05, 340/870.07, 870.16, 870.17, 501, 637, 636; 379/1, 32, 33; 455/423, 424; 320/48, 43, 106, 110, 113

[56] References Cited

U.S. PATENT DOCUMENTS

| | | | |
|---|---|---|---|
| 4,709,202 | 11/1987 | Koenck | 320/43 |
| 5,332,927 | 7/1994 | Paul | 307/66 |
| 5,355,075 | 10/1994 | Wilson, III | 322/25 |
| 5,457,377 | 10/1995 | Jonsson | 320/5 |
| 5,483,463 | 1/1996 | Qin | 364/492 |
| 5,539,810 | 7/1996 | Kennedy | 379/59 |
| 5,544,649 | 8/1996 | David | 128/630 |
| 5,661,463 | 8/1997 | Letchak | 340/636 |
| 5,675,371 | 10/1997 | Barringer | 348/6 |
| 5,710,507 | 1/1998 | Rosenbluth | 320/35 |
| 5,712,779 | 1/1998 | Sheppard | 363/69 |
| 5,818,125 | 10/1998 | Manchester | 307/66 |
| 5,917,308 | 6/1999 | Brooke | 320/118 |
| 5,929,601 | 7/1999 | Kaib | 320/113 |
| 5,978,236 | 11/1999 | Faberman | 363/37 |

*Primary Examiner*—Michael Horabik
*Assistant Examiner*—Albert K. Wong

[57] ABSTRACT

This infrastructure computer and program uses information supplied by sensors to calculate the operational characteristics of back up systems located at central offices during times of crisis such as the loss of commercial power, or some other natural or man-made disaster. The sensors transmit the battery float voltage, power requirements, temperature of critical telecommunication equipment components, average telecommunication equipment temperature, and the amount of fuel available for backup generators provides data to an infrastructure management computer program. The computer program accesses databases containing known information such as the power curves for the backup generators, and battery discharge curves for the battery string. The infrastructure management computer program calculates the battery hour reserve, the fuel hour reserve, and thermal reserves to more accurately predict the operational status of the central office for improved disaster planning.

11 Claims, 6 Drawing Sheets

6,067,030

METHOD AND APPARATUS FOR PROVIDING NETWORK INFRASTRUCTURE INFORMATION FOR A NETWORK CONTROL CENTER

FIELD OF THE INVENTION

This invention relates to systems for monitoring, tracking, updating and managing information pertaining to telecommunication network infrastructures.

DESCRIPTION OF THE PRIOR ART

Almost all telecommunication equipment contains integral alarms in the circuits indicating a failure of service. The extent and type of alarms vary with the manufacturer, but generally alarms draw attention to equipment that has failed or is about to fail, and directs the technician to the defective equipment.

Many telecommunication networks contain central offices that house the telecommunication equipment linking customer premises equipment to the public switched telephone network. These central offices typically contain alarm systems to aid in alerting operators of the equipment to problems. The alarms are usually segregated into major and minor categories to show the seriousness of the trouble and transmit either audible or visual alarms, or both to operations personnel.

In unattended central offices, telemetering equipment transmits the alarms to attended control centers. These attended control centers are typically equipped with computers for monitoring and managing problems and in some cases are capable of diagnosing the cause of the problem.

One of the most serious problems that can adversely impact the operation of a telephone central office is the loss of commercial power. As a result, central offices are usually equipped with backup power systems that may include battery strings and/or backup generators. Such backup power systems must provide sufficient power to operate the telecommunication equipment and the supporting equipment including the cooling systems.

Many central offices operate equipment requiring both alternating current (AC) and direct current (DC). Rectifiers convert part of the AC commercial power to DC for supplying the equipment requiring DC current. During commercial power failure, the DC current is usually supplied by battery plants. For those central offices operating equipment requiring AC current, many central offices employ backup generators or DC to AC converters (inverters) that provide AC current from the DC battery plant and AC to DC converters for maintaining the battery chain in a charged state.

The management of the backup power operations is extremely complex. When commercial power fails at a central office, the power load placed on the backup systems changes as environmental factors change. For example, if a central office has both one or more battery backup systems and one or more emergency generating systems, the backup generator(s) can periodically recharge the batteries as well as provide power to other equipment in the central office. When fuel supplies for the backup generator(s) are exhausted, the central office will lose its cooling system(s). Once the cooling system(s) are lost, the telecommunication equipment will operate until its battery back up system is unable to supply sufficient power for the telecommunication equipment or until the telecommunication equipment over heats.

Other factors such as weather and amount of calls handled by the central office requiring peripherals to constantly go on line and off line, affect the power demands of the central office.

Monitoring service interruptions such as loss of commercial power from crisis centers is extremely important. Network management becomes even more complex when one or more natural disasters such as fires, floods, earthquakes, hurricanes and ice storms causes the loss of commercial power to numerous central offices.

FIG. 1 discloses a prior art system for monitoring and managing a central office backup system. Loss of commercial power at a central office 10 generates alarm signals 12 to a center power module 14. The center power module 14 alerts a subject matter expert, i.e., a (technician skilled to solve that particular problem) 16, and manually obtains or gathers raw data regarding the battery voltage, central office power load, fuel supply, fuel consumption rate (i.e., an individual responsible for network management), and telecommunication equipment status.

The central power module 14 also alerts the crisis control commander (CCC) 18 who receives the raw data verbally from the subject matter expert 16. The crisis control commander 18 manually calculates the battery hour reserve and fuel hour reserve by examining battery discharge tables (charts) and backup generator performance charts. The crisis control commander 18 verbally communicates the infrastructure data to the regional network operations (RNOC) center 20. The regional network operations center 20 verbally or electronically sends the infrastructure data to the network operations center 22. Unfortunately, the calculation of reserve battery life and fuel hours reserves change constantly due to the changing power demands. Current methods of calculating these reserves also require manual calculations that are subject to human error, and are not representative of real time events.

There exists a need to automatically calculate this information and provide real time transmission of this information to the crisis commanders to facilitate optimum network management. A need also exists for the real time transmission of this data to other employees monitoring the crisis and possibly to governmental disaster agencies, public relations employees, and customers.

SUMMARY

The present invention provides a technique for providing network infrastructure information to a network control center that relies on sensor information to calculate the operational characteristics of back up power systems for central offices during times of crisis such as the loss of commercial power, or some other natural or man-made disaster for use by a crisis manager or management team. Three vital components are required by the crisis management team when a problem occurs: the battery hour reserve (battery life), the fuel hour reserve (fuel quantity for the backup generators), and thermal reserve (amount of time before the telecommunication equipment temperature reaches full duplex failure).

A variety of sensors sense to the battery float voltage, power requirements, temperature of critical telecommunication equipment components, average telecommunication equipment temperature, and the amount of fuel available for backup generators to provide such data to an infrastructure management computer processor. This processor accesses databases containing known information such as the fuel consumption of the backup generators, electrical power demand of the telecommunication equipment and cooling systems, and battery float voltages. The infrastructure management computer program calculates the battery hours' reserves, the fuel hours reserves and more accurately predict the operational status of the central office for improved disaster planning.

The infrastructure management computer processor is usually located at a network operations center, regional operations center or a crisis operations center. The processor can provide this operational status of the central office and its backup systems network wide by transmitting the information generated in the infrastructure management computer program via a secure network employing Intranet channels or via an encrypted transmission over Internet channels. The information is presented to users in a graphical user interface providing real time or close to real time status on the infrastructure.

DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DESCRIPTION OF THE PREFERRED EMBODIMENT

Figure 1:
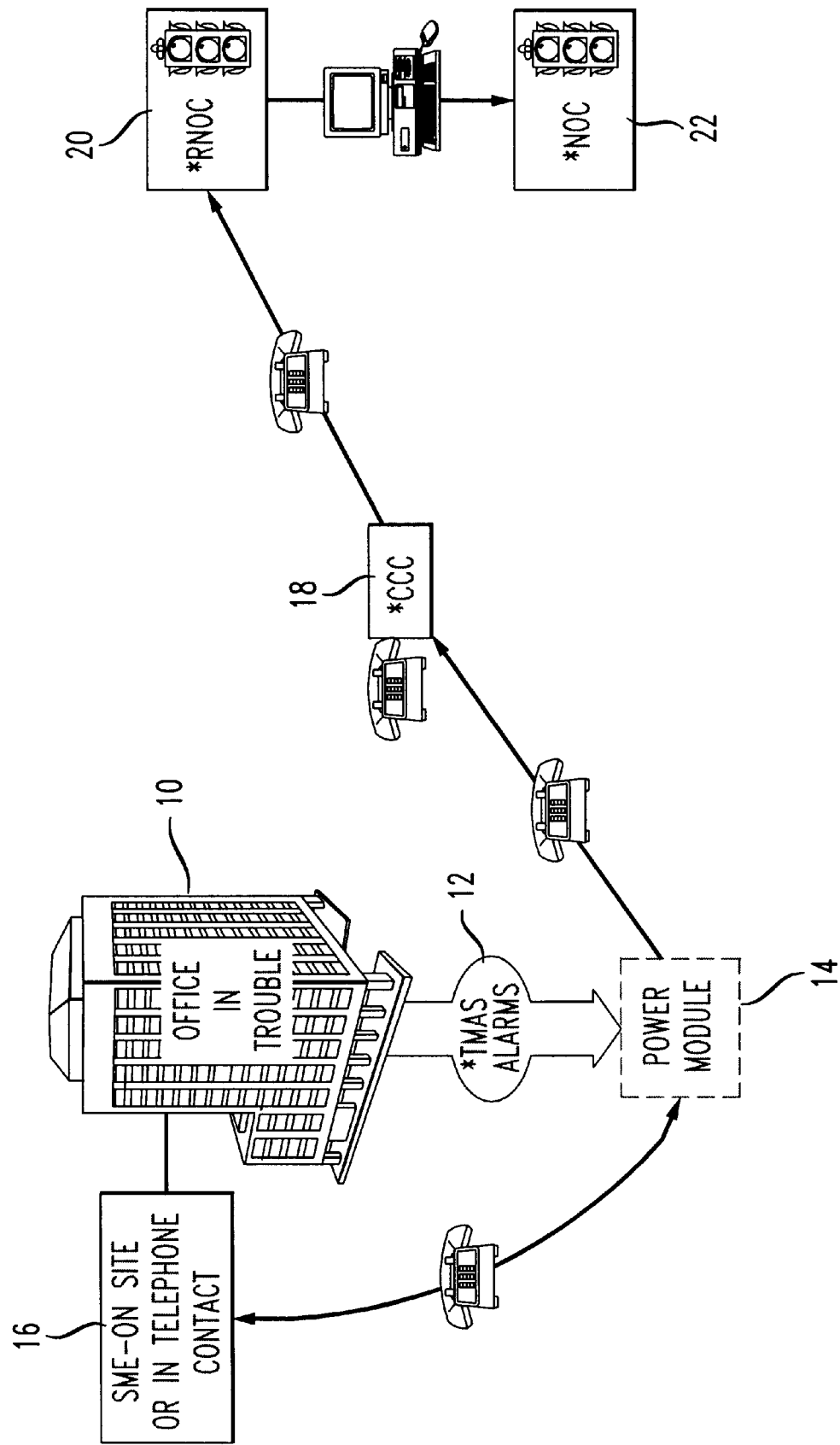
FIG. 1 illustrates a block diagram of the current scheme for managing network infrastructure information.
Figure 2:
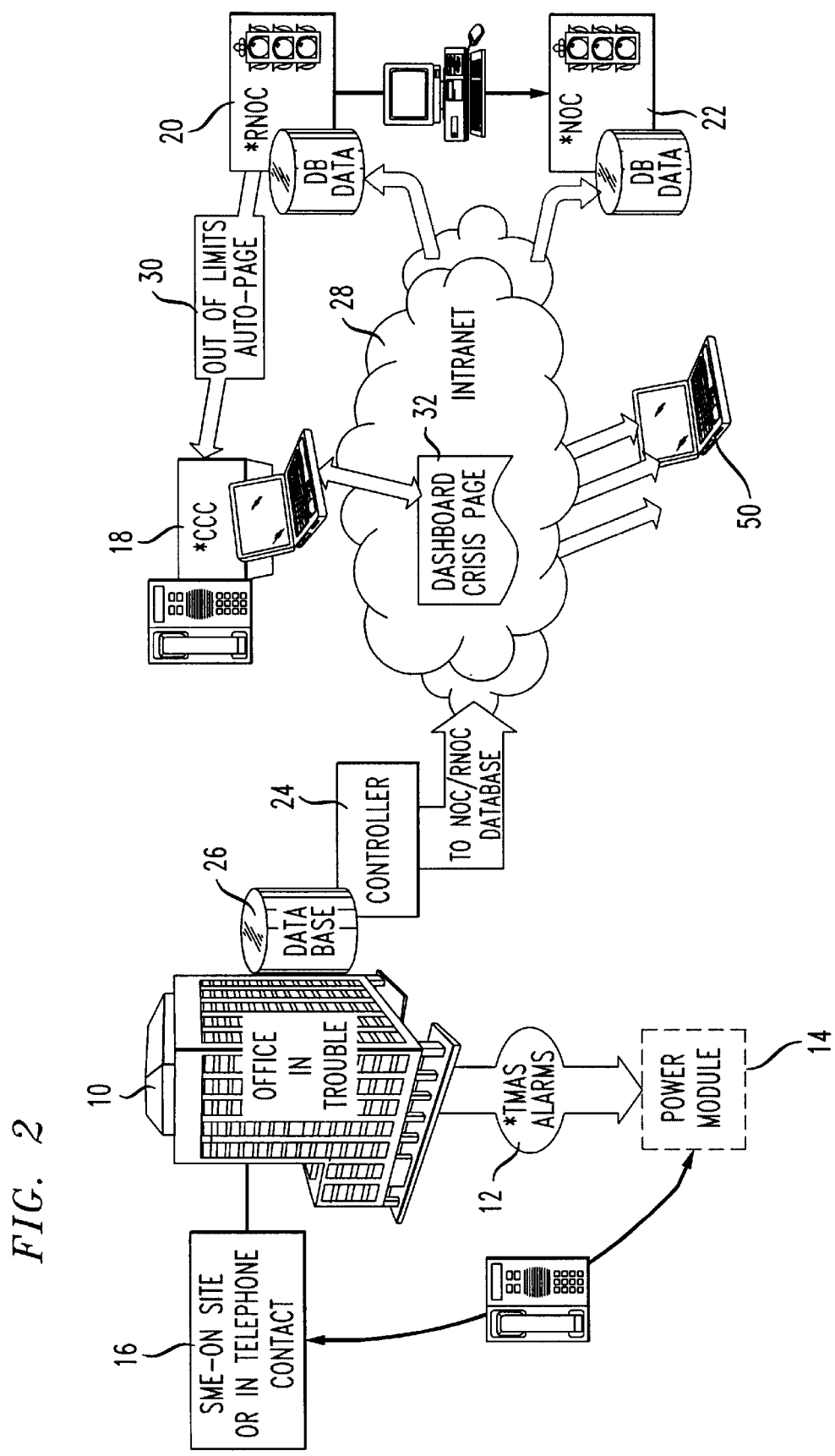
FIG. 2 illustrates a block diagram for managing network infrastructure information.

This invention discloses a network wide system for monitoring and managing telecommunication equipment centers housing switching and routing equipment including the ability to manage electronically these centers from a crisis center. FIG. 2 illustrates a block diagram for an automated management system providing an infrastructure management computer program for handling crisis problems relating to the communication network infrastructure. The central office 10 contains electronic sensors (described in greater detail in FIG. 3) for providing information relating to the fuel quantity, battery cell voltage, temperature of critical telecommunication equipment components, average temperature of the telecommunication equipment, current load, power load, and telecommunication equipment status. This sensor information is provided to a controller 24 and stored in a database 26. This information is also sent via one or more channels of the Intranet 28 (private communication channel) or by an encrypted transmission on one or more channels of the Intranet 28, the public switching telephone network (PSTN) or some other communication channel such as wireless transmission, to the network operations center 22 and a regional network operations center 20 on a regular periodic basis, this providing real time or near real time information regarding the backup power systems located at the central office 10.

The backup power systems status information is stored in databases located at the central office 10, the network operations center 22, and the regional network operations center 20. When alarms 12 are tripped at the central office 10, alert messages are sent by the central office 10 to the power module 14. The power module 14 alerts the subject matter expert 16 who is either located at the central office or capable of being contacted by telephone or beeper. The subject matter expert 16 is relieved of data collection duties and can concentrate efforts on solving the problem. As the alarms 12 are sent to the regional network operations center 20, the regional network operations server transmits an out of limits autopage 30 (i.e., a graphical display screen) to a preselected group of users typically including the crisis control commander 18.

Once the crisis control commander 18 is alerted, the commander can establish communications with the subject matter expert 16, the power module 14 or other individuals electronically. The crisis information page located on the Intranet 28 provides the real time or near real time transmission of information so that all the individuals connected can monitor the crisis situation. In addition, authorized individuals such as public relations representatives, executives, or governmental disaster agencies can view the information 32.

Figure 3:
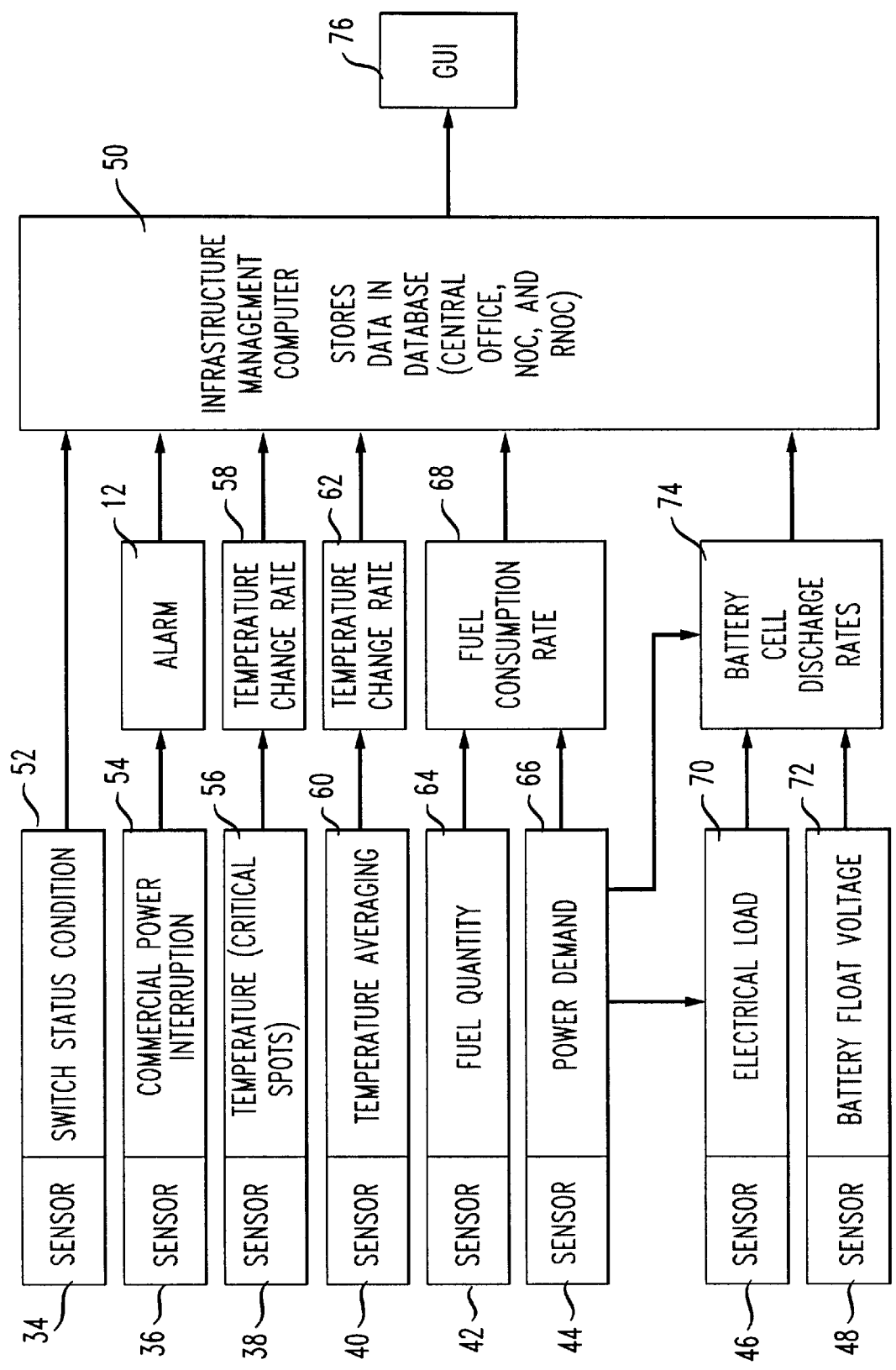
FIG. 3 illustrates a block diagram of the transmission of data necessary to manage network infrastructure information.

FIG. 3 illustrates a block diagram of a system for the transmission of the data necessary to manage network infrastructure information. At the central office, a series of sensors 34, 36, 38, 40, 42, 44, 46, and 48 provide data on a periodic basis to an infrastructure management computer 50 for further calculation of information needed by the central office crisis management. The basis for reporting of data can be continuous, providing real time status, or periodic providing data at intervals as short as five to ten minutes or as long as an hour.

Sensor 34 provides the telecommunication equipment status condition 52 such as the commercial power failed and the backup generator also failed to come on line. Sensor 36 provides the commercial power interruption status 54. When commercial power is interrupted, an alarm 12 is sent by the commercial power sensor 36 to the infrastructure management computer 50. The telecommunication equipment status condition 52 changes as commercial power is restored or other aspects of the communication infrastructure fail.

One key aspect of proper operation of telecommunication equipment is operation within very specific temperature ranges. For example, above 80° C., most communication equipment experience service degradation. Above 90° C., most communication equipment suffer full-duplex failure that can affect telecommunication traffic on a regional basis or cause a loss to the entire central office (e.g., causes a fire). At least one sensor 38 and preferably a plurality of sensors, are strategically placed within the central office for monitoring the temperature of critical components 56. As temperatures at these strategic locations change, the critical spot temperature change rate 58 is calculated. Additional sensors 40 provide temperature averaging 60 throughout the central office and from the average temperature, a change in average 62 temperature can be calculated. The sensors 38 and 40 provide a more accurate temperature measurement of the entire central office instead of relying on a centrally located thermostat that might be located in a hot or cold spot within the central office.

The thermal reserve, the time before the telecommunication equipment suffers full duplex failure, varies between the types and operating components of the telecommunication equipment. Many variables influence the temperature that causes full duplex failure including room temperature, rate of temperature increase, humidity, air flow in the central office and outside air temperature. Therefore, thermal reserve is an approximate temperature fail time and focus is instead placed on the telecommunication equipment status condition 52 such as percentage of blocked calls, service impairment, and component failure.

Sensor 42 provides the level of fuel quantity 64 for the backup generators. Veeder Root sensors are one type of electronic sensor for providing fuel quantity to the infrastructure management computer 50. Sensor 44 provides the power demand 66 of the backup generators. The fuel consumption rate 68 is calculated from data collected indicative of the power demand thus providing the fuel hour reserves (amount of time remaining before fuel is exhausted). Fuel hour reserve is a function of the fuel storage in gallons divided by the consumption rate in gallons per hour. The consumption rate is a function of backup generator loads, the size and type of the backup generator, the age (since the last major overhaul) and overall maintenance condition of the backup generator.

Sensor 46 provides the electrical load 70 of the central office including the lighting, heating, ventilation and air conditioning (HVAC), power to the telecommunication equipment, and peripheral devices. The battery float voltage 72 is usually a known value but sensors 48 provide the actual charge of the battery string. The actual charge might differ from the battery float voltage due to the age of the battery string as well as recent use. From the electrical load and the available battery string voltage, the battery cell discharge rates 74 can be calculated. These values are calculated by accessing the known cell discharge curves for the particular battery string. From these values, the battery hour reserve 106 can be calculated, providing the battery string life based on the current electrical load. As the electrical load changes, the battery string life can increase or decrease.

The battery hour reserve uses an algorithm to determine a given battery string's reserve time based upon an electrical current load (discharge amperes), string voltage, temperature the manufacturer and type of cell, number of cells in the battery string, and the cell voltage at which discharge is considered complete.

Also affecting the battery hour reserve 106 is the operational status of the backup generator, which if lost, can significantly decrease the battery string life. Conversely, if the backup generator is operational, it can extend the battery string life by recharging the battery string and providing electrical power to the central office until fuel supplies are exhausted.

The telecommunication equipment status condition 52, commercial power interruption alarm 12, critical spot and average temperature rates 58 and 60, changes in critical spot and average temperatures 58 and 62, fuel reserve (fuel quantity) 64, power demand 66, fuel hour reserve 104, electrical load 70, battery float voltage 72, and battery hour reserve 106 provide the input data to the infrastructure management computer 50. This data is stored in databases and the infrastructure management computer 50 is capable of accessing other databases such as the battery discharge curves and power ratings for the various backup generators. This data varies as to make, model, and age of the equipment.

The infrastructure management computer 50 can be located in the central office, but is typically located in the network operations center, the regional operations center or some other secure facility. The information provided by the program is transmitted over a secure communication network such as an Intranet or encrypted and sent over the Internet. The information is displayed to the user in a user friendly, graphical user interface 92.

Figure 4:
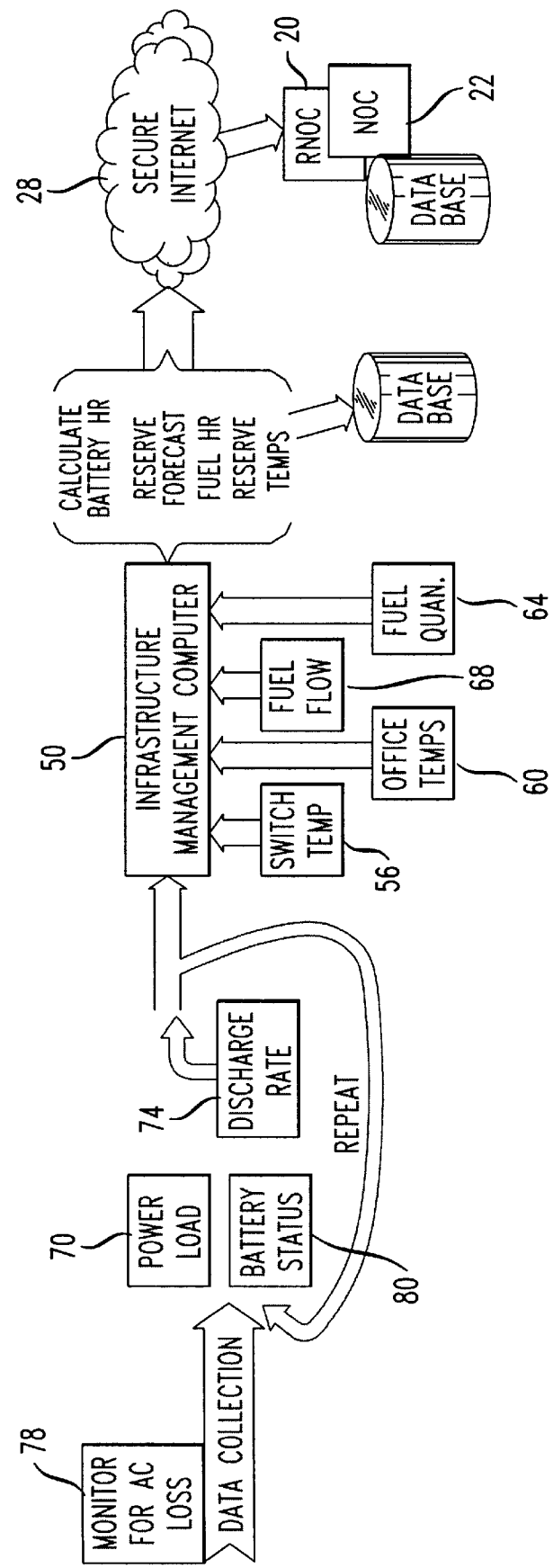
FIG. 4 illustrates a block diagram of the transmission of data necessary to manage network infrastructure information.

FIG. 4 illustrates a block diagram of the transmission of data necessary to manage network infrastructure information. The infrastructure management computer 50 (see FIG. 3) monitors the power line current for loss of AC 78. The power load 70 and battery status 80 is continually monitored and the data is transmitted to the controller 82. When commercial power is lost, the batteries come on line and their discharge rates are monitored 74. The controller 82 also monitors the sensors providing information on the telecommunication equipment temperature 56, the central office temperature 96, the fuel flow (fuel consumption rate) 68 to the backup generators and the fuel quantity 64. This data is transmitted by the controller 82 over the secure Intranet or Internet 28 to a storage location at the regional network operations center 20 or the network operations center 22. The battery hour reserve and fuel hour reserve is calculated and the resulting output is transmitted to the graphical user interface 76 of FIG. 3 for the infrastructure management computer 50. Data can also be stored at the central office or another secured facility 84.

Figure 5:
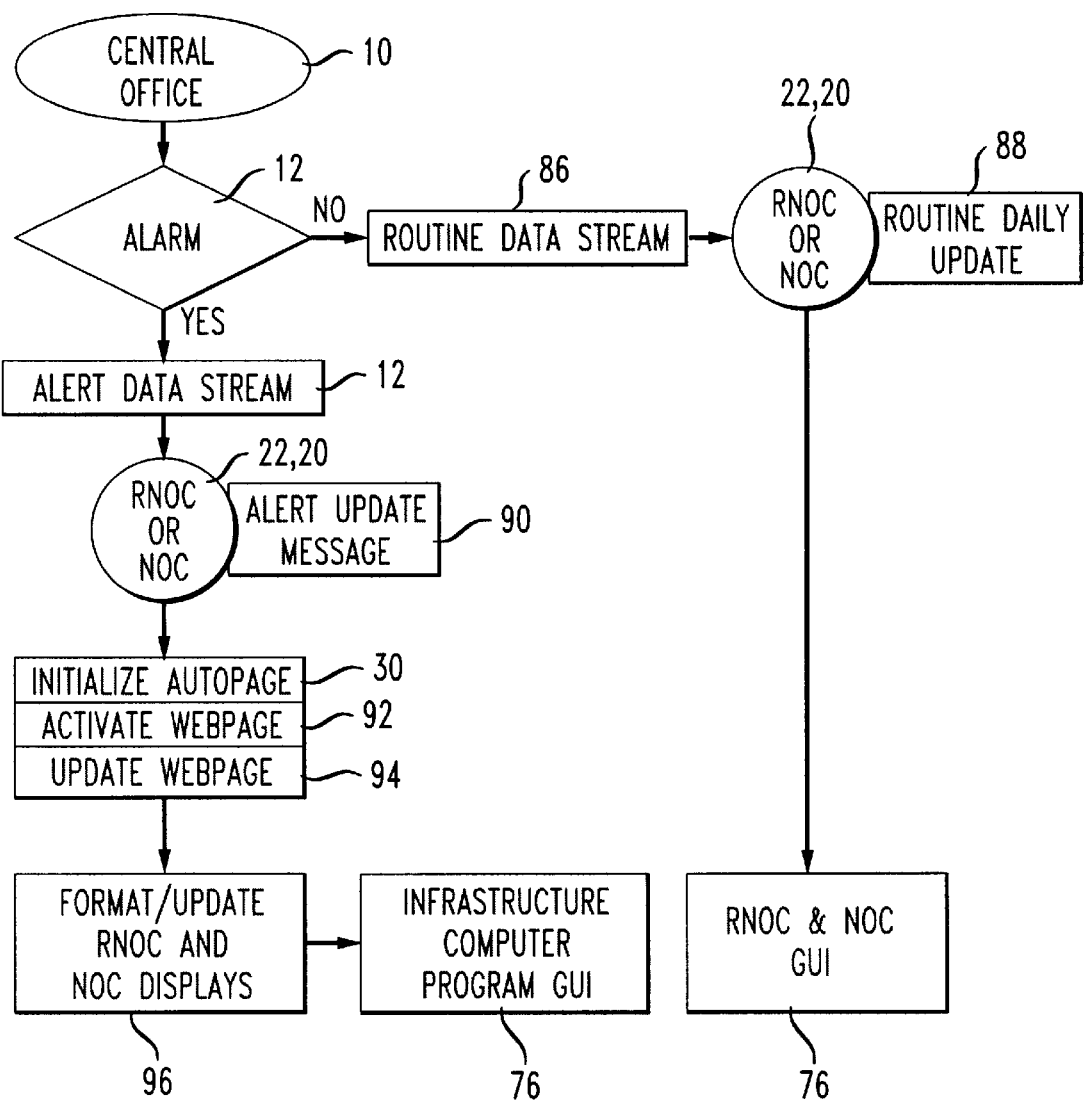
FIG. 5 illustrates the alarm signal flow and reformating of infrastructure data sent from the central office to the regional network center and network operations center.

In FIG. 5, the central office 10 periodically generates signals containing data relating to the operation of the central office 10. Depending upon the type of data, those signals are sent daily, hourly, in real-time, or is some other predetermined reference period. When the central office 10 experiences a problem an alarm signal 12 is generated. In some instance, the alarms 12 are minor and indicate that a particular piece of equipment needs repair, overhaul or replacement. Other alarm signals 12 indicate serious problems or the potential for serious consequences if action is not immediately taken.

When such a problem arises, alarm signals 12 are generated at the central office 10 and transmitted along with the normal flow of data being sent from the central office to the regional network operation center 20 and the network operations center 22. Serious problems generating alarm signals 12 requiring immediate action include activities that might affect operation of the telecommunication equipment, such as loss of commercial AC power, loss of cooling systems, fire, or certain equipment failures. Without immediate action, the loss of cooling systems or interruption of commercial AC power can seriously impact service the level of service provided by the telecommunication equipment and can in some circumstances lead to the loss of the entire central office including the telecommunication equipment and routing or switching equipment and possibly loss of telecommunication service in a region of the country.

In normal operation, central office status information data is transmitted from the central office 10 to the regional network operations center 20 and the network operations center 22. Minor alarms 12 are also sent and their resolution can be incorporated into scheduled repair and resolution. When no alarms are triggered, the normal data stream 86 is sent and periodically stored at the regional operations center 20 or the network operations center 22. The normal data stream 86 routinely updates 88 the regional network operation center and network operation centers graphical user interfaces (GUIs) 76.

However, when serious alarms are generated, such as loss of commercial AC power, the problem triggers an alarm signal 12, and an alert massage 12 is sent to the regional network operations center 20 and the network operations center 22. The alert data stream message 12, causes the infrastructure management computer 50 to send alert update messages 90 that initializes the autopage feature 30, activates the webpage 92, and updates the webpage 94. The infrastructure management computer 50 formats and updates the crisis information 96 providing real time or almost real time data regarding the supporting backup infrastructure and generates a user-friendly, graphical user interface (GUI) 76 for the data. The graphical user interface 76 is illustrated in FIG. 6.

The infrastructure management computer 50 typically comprises a server or a personal computer capable of Internet or Intranet connectivity and uses a computer readable medium employing a plurality of data structures. The first data field contains data representing the location of the central office and stores this data in a memory address in the medium. The second data field contains data representing battery hours reserved and stores the data in a separate region having a distinct memory address in the medium. The third data field contains data representing fuel hours reserved stored in another separate region having a distinct memory address in the medium. The fourth data field contains data representing temperature of the central office and is stored in a distinct memory address in the medium. An index stored in an index region of the memory addresses provides relationship information indicating the relationship between the first data field and the second, third, and fourth data fields, where during a predetermined data processing operation on the first data field, the index is examined and the first, second, third and fourth data fields are displayed in a graphical user interface.

The infrastructure computer program has a fifth data field containing data representing telecommunication equipment condition temperature of the central office and stores this information in a distinct memory address in the medium. The sixth data field contains information regarding the change in telecommunication equipment temperature of the central office and stores the information in a distinct memory address. The index stored in the index region of the memory addresses provides the relationship information between the fifth and six memory addresses and other memory addresses. Other data fields also contain information regarding the fuel supplies, battery discharge rates and battery power. This information is stored for a short period of time and then deleted to prevent the data history of a central office from overwhelming the memory capacity in the server. When an emergency does occur, the infrastructure program can collect and store all the data relating to the problem for analysis at a later date.

Figure 6:
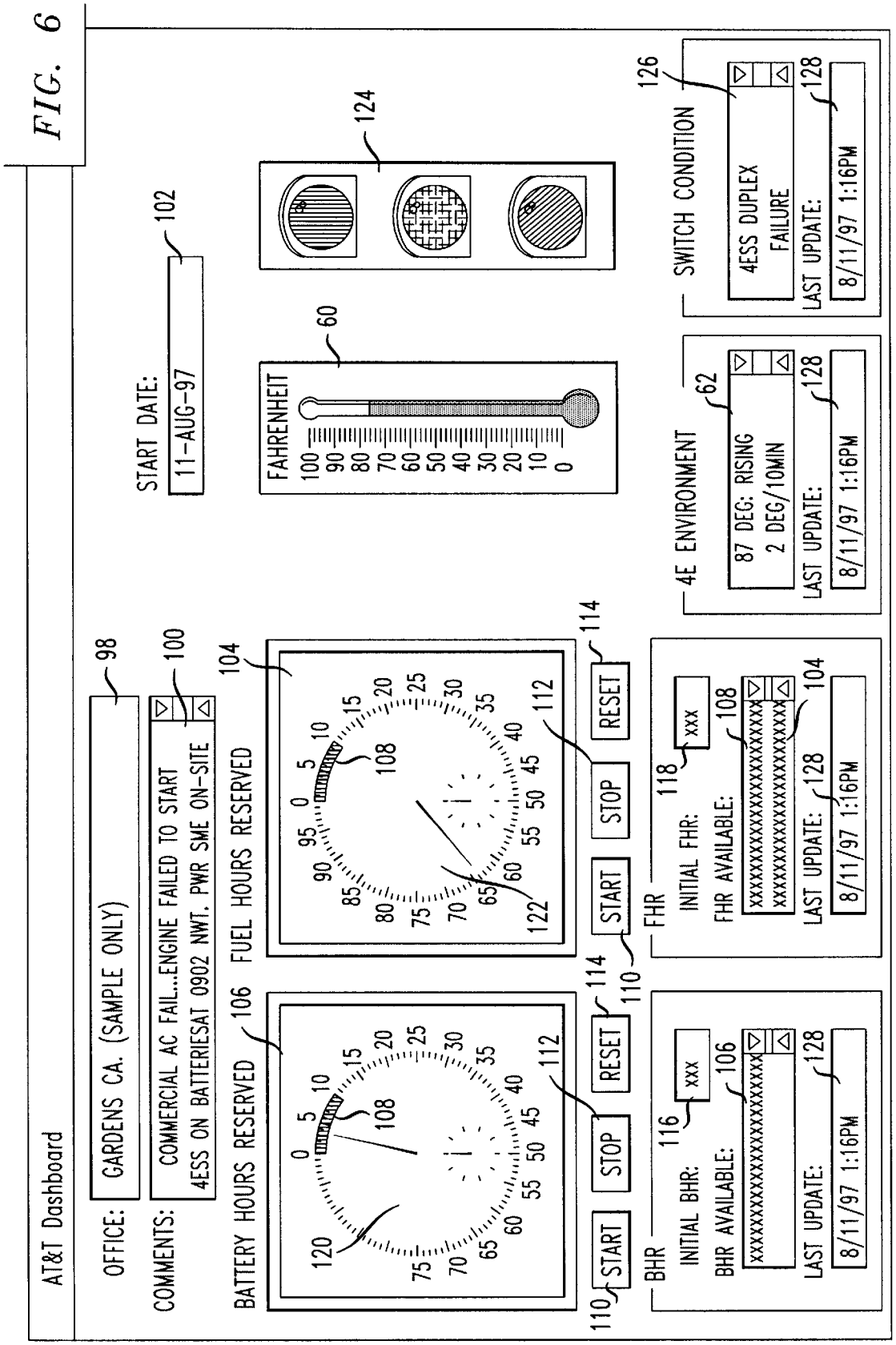
FIG. 6 illustrates a computer screen graphical user interface for presenting network infrastructure information to the user.

The infrastructure management computer program provides the data to users in a graphical user interface illustrated in FIG. 6. The graphical user interface displays the central office name 98 and comments 100 regarding the problem experienced by the central office. Also displayed are the start date of the problem 102, the average temperature of the central office 10, the fuel hour reserve 104, the battery hour reserve 106. The fuel hour reserve 104 and the battery hour reserve 106 are displayed in a gauge format. With color indicators on the gauges indicating those values that are in the acceptable range (green), danger range (yellow), and failure range (red) 108. For both gauges 120 and 122, the user can input start 110, stop 112 and reset 114 commands. Below the gauges 120 and 122, the initial battery hour reserves 116 and initial fuel hours reserves 118 are provided and displayed.

Below the display of the average temperature for the central office 60 is the temperature increase rate 62. Also, provided below the telecommunication equipment condition 124 is the telecommunication equipment status condition 126. For the battery hours reserve available 106, the fuel hours reserve available 104, the temperature increase rate 62 and the telecommunication equipment status condition 126, are last update times 128 for the displayed information.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A method for generating automated infrastructure status information supporting operation of a telecommunication equipment, comprising the steps of:

collecting temperature data from the telecommunication equipment;

collecting backup battery reserve power data for the telecommunication equipment;

collecting electrical power demand data of the telecommunication; and transmitting the temperature data, backup battery reserve power data, and electrical power demand data to a server capable of processing the data and calculating battery hours reserves, battery discharge rates and generating the battery hours reserves and battery discharge rates output data.

2. The method for generating automated infrastructure status information supporting the operation of the telecommunication equipment of claim 1, further comprising the steps of:

collecting spot temperature data from critical spots in the telecommunication equipment; and transmitting the spot temperature data to the server and generating output data from the calculation of estimated failure time.

3. The method for generating automated infrastructure status information supporting the operation of the telecommunication equipment of claim 1, further comprising the step of displaying the output data in a graphical user interface.

4. The method for generating automated infrastructure status information supporting the operation of the telecommunication equipment of claim 1, further comprising the steps of:

collecting interruption of commercial power data to the telecommunication equipment;

transmitting the interruption of commercial power data to the server; and generating output data indicating loss of commercial power to the telecommunication equipment.

5. The method for generating automated infrastructure status information supporting the operation of the telecommunication equipment of claim 1, where at least one Internet channel is used to facilitate transmission of the data.

6. The method for generating automated infrastructure status information supporting the operation of the telecommunication equipment of claim 1, where at least one Intranet channel is used to facilitate transmission of the data.

7. A method for generating automated infrastructure status information supporting the operation of the telecommunication equipment, comprising the steps of:

collecting temperature data from the telecommunication equipment;

collecting battery reserve power data from a battery string supporting the telecommunication equipment;

collecting battery discharge rates from the battery string;

collecting electrical power demand data of the telecommunication equipment;

collecting fuel supply data from fuel quantity for at least one backup generator;

collecting fuel consumption data from the fuel consumption rate of the at least one backup generator; and transmitting the temperature data, the battery reserve power data, the battery discharge rates data, the electric power demand data, the fuel supply data, and the fuel consumption data to a server capable of calculating battery hours reserves and fuel hours reserves from the collected data.

8. The method for generating automated infrastructure status information supporting operation of the telecommunication equipment of claim 7, further comprising the steps of:

collecting spot temperature data from critical spots in the telecommunication equipment; and transmitting the spot temperature data to the server and generating output data from calculating estimated full duplex failure time.

9. The method for generating automated infrastructure status information supporting operation of the telecommunication equipment of claim 7, further comprising the steps of:

collecting recharging data from the recharging of the battery string from current generated by at least one backup generator; and transmitting the recharging data to the server and generating output from the calculation of the battery hours reserves when the battery string is recharging from current supplied by the at least one backup generator and the battery discharge rates data.

10. The method for generating automated infrastructure status information supporting the operation of the telecommunication equipment of claim 7, where Internet channels are used to facilitate transmission of the data.

11. The method for generating automated infrastructure status information supporting the operation of the telecommunication equipment of claim 7, where Intranet channels are used to facilitate transmission of the data.

* * * * *